Patented Oct. 16, 1928.

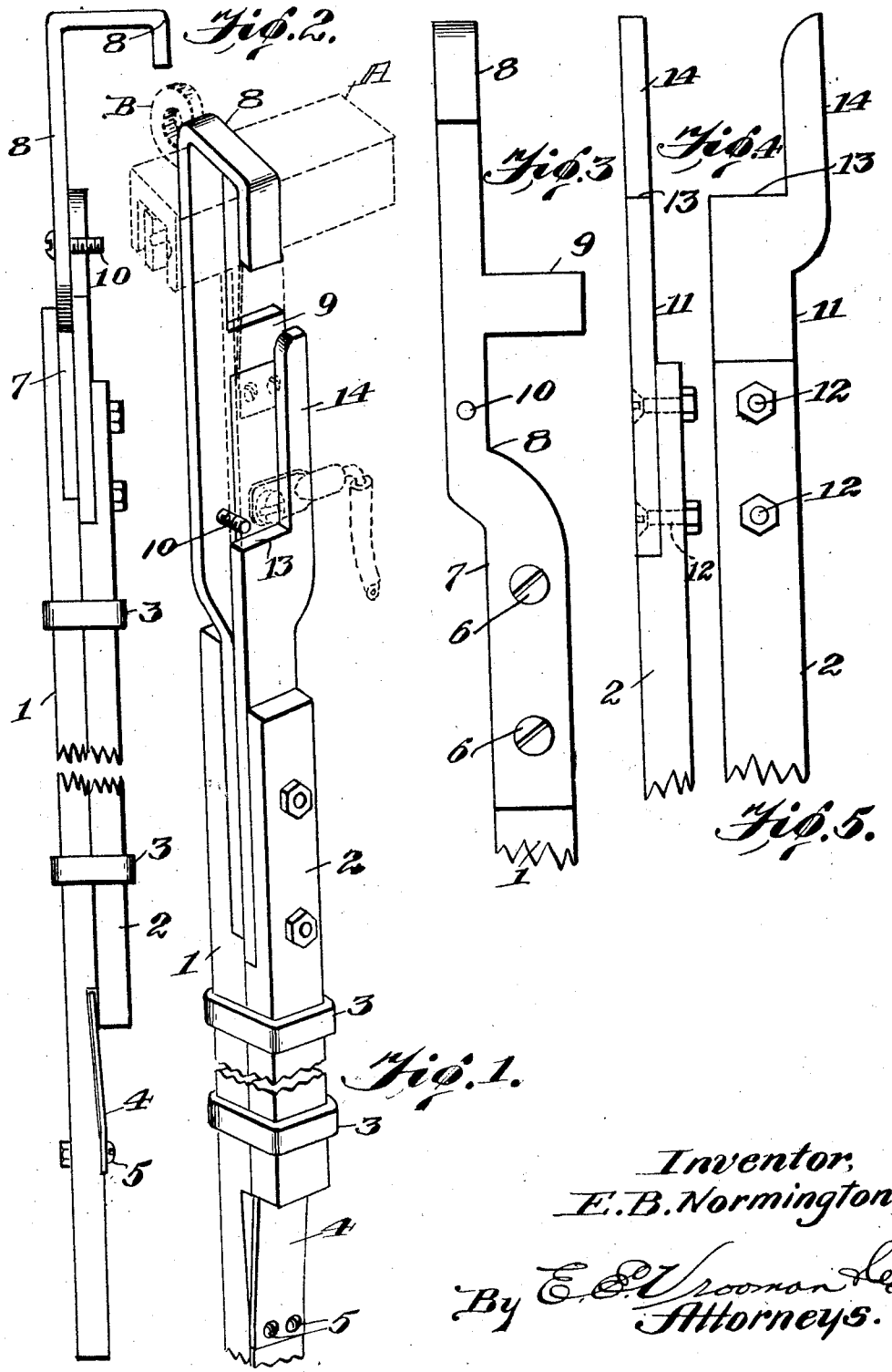

1,687,584

UNITED STATES PATENT OFFICE.

EDWIN B. NORMINGTON, OF SACRAMENTO, CALIFORNIA.

LINE-TAPPER-OPERATING DEVICE.

Application filed August 25, 1927. Serial No. 215,383.

This invention relates to a line tapper operating device.

The object of the invention is the construction of a device which will enable the operator to place a line tapper on a wire at a considerable height.

Another object of the invention is the construction of an operating device which will receive and hold a line tapper, and then enable the operator to place the line tapper on a wire or line without the hands of the operator coming in direct contact with the wire tapper or the wire.

With these and other objects in view, my invention comprises certain novel constructions, combination and arrangements of parts as will be hereinafter fully described, illustrated in the accompanying drawings, and more particularly pointed out in the appended claims.

In the drawings:

Figure 1 is a perspective view of a device constructed in accordance with the present invention.

Figure 2 is a view in side elevation of my line tapper operating device.

Figure 3 is a fragmentary front view of the primary section of the device.

Figure 4 is a view in side or edge elevation of the auxiliary section of my device.

Figure 5 is a fragmentary front view of the auxiliary section of my device.

Referring to the drawings by numerals, 1 designates the primary section, upon which is slidably mounted the auxiliary section 2. These sections 1 and 2 are held in an assembled position by bands or collars 3. A flat binding or locking spring 4 is fastened at 5 on the primary section, so that when the auxiliary section 2 is pushed far enough up on the primary section 1, the inner free end of spring 4 will move out and engage the lower end of section 2 (Fig. 1) locking the auxiliary section against sliding movement in one direction and also tightly against the lower end of a line tapper A, as hereinafter explained.

On the upper end of primary section 1 is fastened, at 6, 6, a plate 7; this plate 7 terminates at its upper or outer end in a hook 8 that surrounds the top part of the line tapper A, and which is also clearly shown in Figure 1 of my co-pending application Serial Number 215,382, filed August 25, 1927. The plate 7 is off-set, at 8, for better receiving the line tapper A. The plate 7 is provided with a horizontal lug 9, and with a screw 10, constituting a stop or stud against which the line tapper A engages. The operator places the line tapper under or within the hook 8 (Fig. 1) with it bearing against the stud 10, and having the cam B (Fig. 1) above or overhanging lug 9. Then the plate 11, fastened at 12, 12 to the auxiliary section 2, is caused (by sliding upwardly the section 2) to engage, at 13, the bottom of the line tapper A with finger 14 resting against one side of said line tapper, with stud 10 against the other side, or edge. When the spring 4 has its free end engaging the lower end of section 2 (Fig. 1) then the plate 11 is usually against the line tapper A, whereby the line tapper is secured, against any accidental displacement, upon the operating device. Then the operator can place the line tapper A on any wire or line he desires, after which a hook device shown in the drawings of my co-pending application Serial Number 215,382, filed August 25, 1927, is inserted in the aperture or eye of cam B, causing the line tapper A to be tightly clamped upon a wire or line, since by pulling down on the cam B, the movable jaw of the line tapper A (fully described in my aforesaid co-pending application Serial Number 215,382, filed Aug. 25, 1927) will be forced against the line to clamp the same tightly.

After the cam B has been operated to clamp the line tapper upon the wire or line, then spring 4 is pressed inwardly, whereupon it will be placed in the position shown in Figure 2, permitting section 2 to be slid downwardly upon section 1, moving plate 11 and its finger 14 clear of the line tapper, then by moving the operating device laterally or to one end of the line tapper, the entire operating device can be moved clear of said line tapper, whereupon the function of setting the line tapper on the wire line will be efficiently and quickly completed.

It is to be noted that I have produced peculiar line tapper receiving means upon the primary section, together with locking means, to wit: plate 11, upon the auxiliary section, whereby the line tapper A is really "nested" upon my operating device until it has been securely fastened upon the desired wire or line, then the operating device can be quickly removed from the line tapper.

While I have described the preferred embodiment of my invention and illustrated the same in the accompanying drawings, certain minor changes or alterations may appear to one skilled in the art to which this invention relates during the extensive manufacture of the same, and I, therefore, reserve the right to make such changes or alterations, as shall fairly fall within the scope of the appended claims.

What I claim is:

1. In a device of the class described, the combination of a primary section, a plate fastened to one end of said primary section, said plate provided at its outer end with a hook adapted to hook over the top of a line tapper, said plate provided with a line-tapper-edge engaging lug, an auxiliary section slidably mounted upon said primary section, and said auxiliary section provided with a plate having a finger adapted to engage one side-edge of a line tapper opposite to the first mentioned edge engaged by said lug.

2. In a device of the class described, the combination of a primary section, a plate fastened to one end of said primary section, said plate provided with an off-set, and with a laterally extending lug and a hook above said off-set, said plate provided with an outstanding stud above said off-set, an auxiliary section slidably mounted upon said primary section, said auxiliary section provided with a plate against the plate of the primary section, and said plate provided with an upstanding finger adapted to engage one side-edge of a line tapper while the stud engages the other side-edge of said line tapper.

In testimony whereof I hereunto affix my signature.

EDWIN B. NORMINGTON.